(12) United States Patent  (10) Patent No.: US 10,873,654 B2
Liu  (45) Date of Patent: Dec. 22, 2020

(54) FOLDING MOBILE PHONE CASE

(71) Applicant: WING TAK LEE SILICONE RUBBER TECHNOLOGY (SHENZHEN) CO., LTD, Guangdong (CN)

(72) Inventor: Tak Nam Liu, Guangdong (CN)

(73) Assignee: WING TAK LEE SILICONE RUBBER TECHNOLOGY (SHENZHEN) CO., LTD, Shenzhen (CN)

( * ) Notice: Subject to any disclaimer, the term of this patent is extended or adjusted under 35 U.S.C. 154(b) by 0 days.

(21) Appl. No.: 16/690,156

(22) Filed: Nov. 21, 2019

(65) Prior Publication Data
US 2020/0344334 A1 Oct. 29, 2020

(30) Foreign Application Priority Data
Apr. 26, 2019 (CN) .......................... 2019 1 0346275

(51) Int. Cl.
H04B 1/3888 (2015.01)
H04M 1/02 (2006.01)
A45C 11/00 (2006.01)

(52) U.S. Cl.
CPC ............... *H04M 1/02* (2013.01); *A45C 11/00* (2013.01); *A45C 2011/002* (2013.01)

(58) Field of Classification Search
CPC ............. H04M 1/0206; H04M 1/0249; H04M 1/72575; H04M 1/02; H04M 1/03; H04B 1/3888; H04B 1/08; H04B 1/03; A45C 11/00; A45C 2011/002
See application file for complete search history.

(56) References Cited

U.S. PATENT DOCUMENTS

| | | | |
|---|---|---|---|
| 8,582,049 B2 * | 11/2013 | Shim | G06F 1/1652 349/58 |
| 10,206,490 B2 * | 2/2019 | Kang | A45F 5/00 |
| 10,310,566 B2 * | 6/2019 | Liao | G06F 1/1681 |
| 10,708,395 B1 * | 7/2020 | Han | G06F 1/1652 |
| 2007/0123325 A1 * | 5/2007 | Kim | H04M 1/0245 455/575.3 |
| 2007/0178948 A1 * | 8/2007 | Maatta | H04M 1/0249 455/575.3 |
| 2013/0141847 A1 * | 6/2013 | Ryu | H05K 5/0017 361/679.01 |

* cited by examiner

*Primary Examiner* — Andrew Wendell

(57) ABSTRACT

The present disclosure provides a novel folding mobile phone case, which comprises an upper casing, a lower casing and a soft connecting portion; wherein one end of the soft connecting portion is connected to the upper casing and the other end of the soft connecting portion is connected to the lower casing, the contact surface of the upper casing and the lower casing is provided with a joint portion, and the upper casing and the lower casing are joined by the joint portion to form a plane; and the size of the upper casing is corresponding to the size of the upper surface of the folding mobile phone, the size of the lower casing is corresponding to the size of the lower surface of the folding mobile phone.

6 Claims, 3 Drawing Sheets

FOLDING MOBILE PHONE CASE

CROSS-REFERENCE TO RELATED APPLICATION

The present application is based upon and claims priority to Chinese patent application No. 201910346275.3, filed on Apr. 26, 2019, the entire content of which is incorporated herein by reference.

TECHNICAL FIELD

The present disclosure relates to the field of terminal accessories, and in particular to a novel folding mobile phone case.

BACKGROUND

The folding mobile phone (foldable phone) is realized by a single display screen and a group of buttons, with the development of the smart phone, the button is removed and the mobile phone has changed from a folding mobile phone to a bar phone. With the development of the smart phone, larger and larger display size of the smart phone is required, but the size of the smart phone is too large to carry conveniently, so a smart folding mobile phone appears. The smart folding mobile phone can be converted between a bar phone and a tablet, commonly known as a smart folding mobile phone.

For smart folding mobile phones, such as Samsung's Galaxy Fold folding mobile phone, the display screen is larger and more flexible, and its value is higher. Therefore, the requirement for the screen is higher and it needs to be protected in both states, thus a shell is needed to protect the smart folding mobile phone.

SUMMARY

The embodiments of the present disclosure provide a novel folding mobile phone case, which can effectively protect the smart folding mobile phone and improve the user experience.

The first embodiment of the present disclosure provides a novel folding mobile phone case, which comprises an upper casing, a lower casing and a soft connecting portion; wherein one end of the soft connecting portion is connected to the upper casing and the other end of the soft connecting portion is connected to the lower casing, the contact surface between the upper casing and the lower casing is provided with a joint portion, and the upper casing and the lower casing are joined by the joint portion to form a plane; and the size of the upper casing is corresponding to the size of the upper surface of the folding mobile phone, the size of the lower casing is corresponding to the size of the lower surface of the folding mobile phone.

Preferably, the lower casing further comprises a rear screen window, and the size of the rear screen window is corresponding to the size of the rear display screen of the folding mobile phone.

Preferably, the soft connecting portion specifically comprises n barrier bars and a soft material connecting the adjacent two barrier bars, wherein n is an integer greater than or equal to three.

Preferably, the upper casing further comprises a camera hole.

Preferably, the lower casing further comprises a sensor hole.

Preferably, the soft material is made of thermoplastic polyurethanes, thermoplastic elastomer or silica gel.

The embodiments of the present disclosure have the following beneficial effects:

it can be seen that the present disclosure technical solution of the novel folding mobile phone case provided by the present disclosure connects the upper casing and the lower casing through the soft connecting portion, so that when the folding mobile phone is folded to form a bar phone, the soft connecting portion is extended, thus the upper casing, the lower casing and both sides of the folding mobile phone can be protected; when the folding mobile phone is placed flat to form a tablet computer, the constriction portion (soft connecting portion) is tightened, and the upper casing and the lower casing form a plane through the joint portion, thereby effectively protecting the folding mobile phone placed flat.

BRIEF DESCRIPTION OF THE DRAWINGS

To more clearly illustrate the technical solution in the embodiments of the present disclosure, drawings used in the description of the embodiments will be briefly described below. Obviously, the drawings in the following description are some embodiments of the present disclosure. Those skilled in the art can also obtain other drawings based on these drawings without any creative efforts.

DESCRIPTION OF THE EMBODIMENTS

The technical solution in the embodiments of the present disclosure is clearly and completely described below with reference to the accompanying drawings in the embodiments of the present disclosure. Obviously, the described embodiments are a part of the embodiments of the present disclosure, rather than all of the embodiments. All other embodiments obtained by those skilled in the art based on the embodiments of the present disclosure without paying any creative efforts are within the scope of protection of the present disclosure.

The terms, such as "first", "second", "third" and "fourth" etc., in the specification and claims of the present disclosure and the accompanying drawings are used to distinguish different objects, and are not intended to describe a specific order. Furthermore, the terms "comprise" and "have" and any variations thereof are intended to cover a non-exclusive inclusion. For example, a process, method, system, product, or device that comprises a series of steps or units is not limited to the listed steps or units, but optionally comprises steps or units that are not listed, or optionally comprises other steps or units inherent to these processes, methods, products or devices.

References to "an embodiment" herein mean that a particular feature, structure, or characteristic described in connection with the embodiments can be included in at least one embodiment of the present disclosure. The appearances of the phrase in various places in the specification are not necessarily referring to the same embodiments, and are not exclusive or alternative embodiments that are mutually exclusive from other embodiments. Those skilled in the art will explicitly and implicitly understand that the embodiments described herein can be combined with other embodiments.

Figure 1:
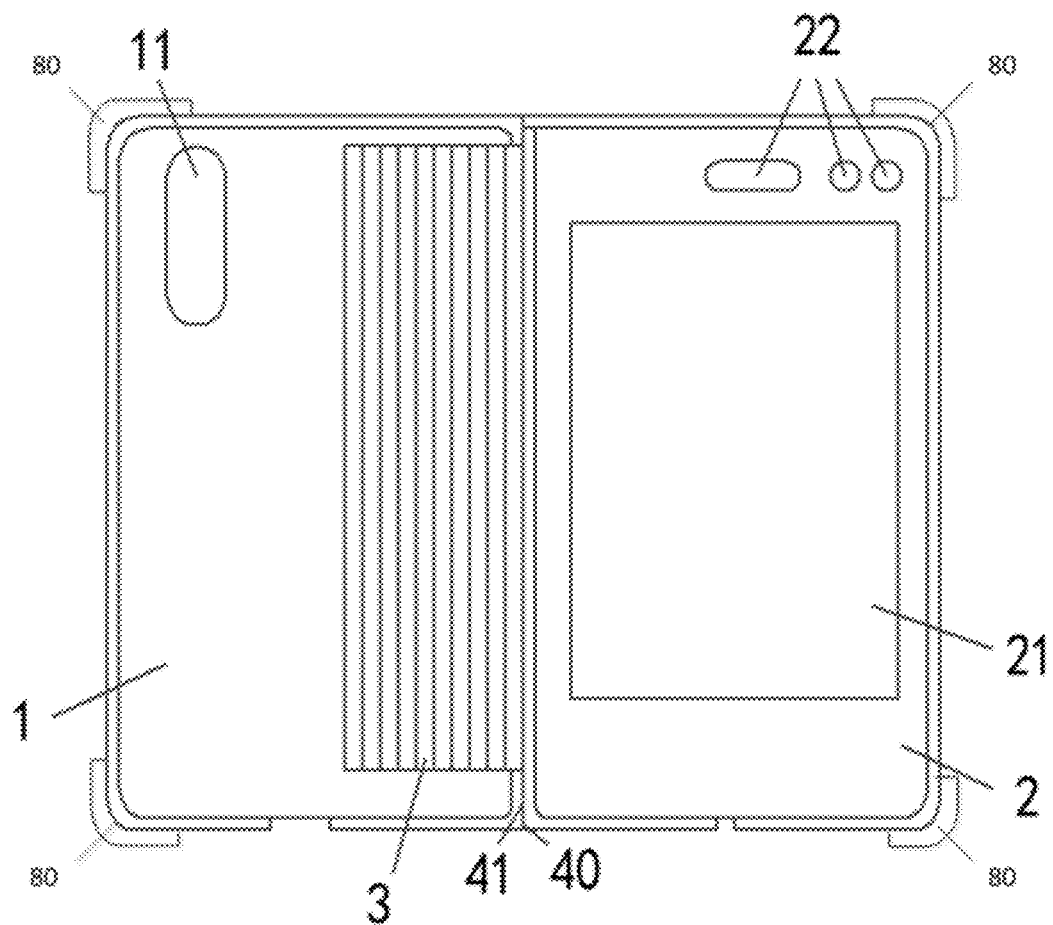
FIG. 1 is a structural schematic diagram of a novel folding mobile phone case provided by an embodiment of the present disclosure.

Referring to FIG. 1, FIG. 1 provides a splicing schematic diagram of a novel folding mobile phone case. As shown in FIG. 1, the folding mobile phone case comprises an upper casing 1, a lower casing 2 and a soft connecting portion 3, wherein one end of the soft connecting portion 3 is connected to the upper casing 1 and the other end of the soft connecting portion 3 is connected to the lower casing 2, the contact surface 40 of the upper casing 1 and the lower casing 2 is provided with a joint portion 41 (which can be disposed on the top portion and the bottom portion, or can be disposed on the top portion, the middle portion and the bottom portion), and the upper casing 1 and the lower casing 2 are joined by the joint portion 41 to form a plane, and the size of the upper casing 1 is corresponding to the size of the upper surface of the folding mobile phone, the size of the lower casing 2 is corresponding to the size of the lower surface of the folding mobile phone.

Figure 3:
FIG. 3 is a schematic diagram of a usage scenario provided by an embodiment of the present disclosure.

The technical solution of the novel folding mobile phone case provided by the present disclosure connects the upper casing and the lower casing through the soft connecting portion, so that when the folding mobile phone is folded to form a bar phone, the soft connecting portion is extended, thus the upper casing 1, the lower casing 2 and both sides of the folding mobile phone can be protected; when the folding mobile phone is placed flat to form a tablet computer, the constriction portion, i.e. soft connecting portion, is tightened, and the upper casing and the lower casing form a plane through the joint portion (as shown in FIG. 3), thereby effectively protecting the folding mobile phone placed flat.

Figure 4:
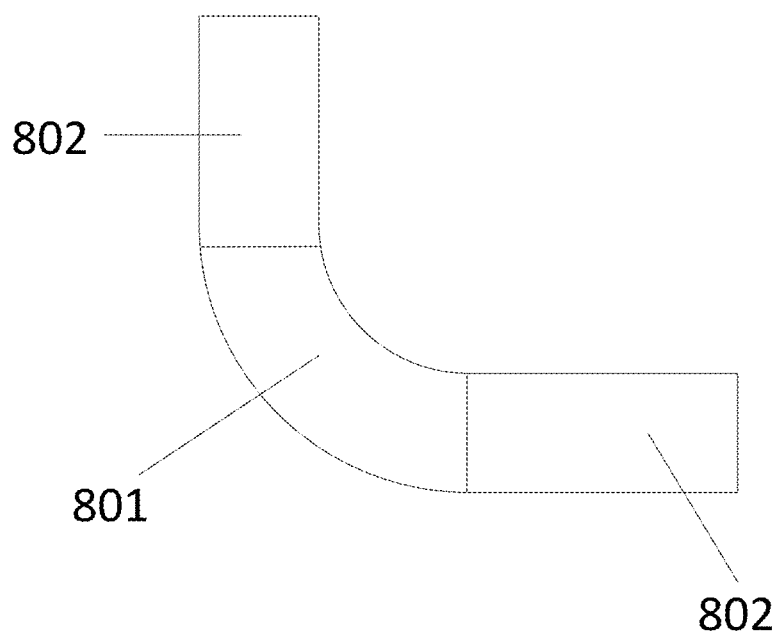
FIG. 4 is a structural schematic diagram of a flexible protection portion provided by an embodiment of the present disclosure.

Optionally, as shown in FIG. 1, a flexible protection portion 80 is disposed at a lower left corner and an upper left corner of the above upper casing 1, and two flexible protection portions 80 are disposed at the lower right corner and the upper right corner of the lower casing 2 respectively, as shown in FIG. 4, the flexible protection portion 80 has a hollow structure, and the rounded corner 801 thereof is made of a flexible plastic, and the straight line 802 thereof is made of a hard plastic, and the hollow structure is provided with dichloromethane liquid, and the volume of dichloromethane is smaller than that of the hollow structure.

It has been found that more than 80% of the damage to the mobile phone screen is caused by the damage to the four corners, for the folding mobile phone screen, because of its larger mass, the corner impact of the screen is greater, and the damage to the four corners is easier. In order to better protect the four corners from damage, the flexible protection portion is specially provided by the folding mobile phone case of the present disclosure, and the rounded corner of the flexible protection portion 80 is set as a flexible plastic, and the hollow structure is filled with a portion of the dichloromethane liquid, so that when the mobile phone falls down, the rounded corner touches the ground. Since the rounded corner first touches the ground, at this time most of the dichloromethane liquid is concentrated at the rounded corner, after the mobile phone falling down, the rounded corner produces a large backlog of force, which causes the dichloromethane liquid to splash to the straight line 802. The splashed dichloromethane liquid takes away some of the falling kinetic energy, which can make the damage of the four corners smaller, so it has the effect of protecting the screen from damage.

For the selection of the liquid, firstly, a liquid having a relatively high density, that is, a liquid having a density greater than water, such as mercury, should be selected. But for mercury, it is highly toxic, and when used in a mobile phone case, it will have some environmental influences; therefore the mercury cannot be used. In addition, the liquid also needs to be transparent, because it can not affect the appearance of the product when not in use, and it is not easy to burn. In combination with various circumstances, the inventor selects a dichloromethane liquid, which is not easy to burn, and transparent and low toxicity.

For dichloromethane, its density is 1.325 g/ml at 25° C., the appearance is colorless transparent volatile liquid, and the ignition point is 662° C. Therefore, the liquid is used in the present disclosure.

Certainly, in practical applications, in order to further improve safety, the hollow structure can also be filled with water.

Optionally, the above lower casing may further comprise a rear screen window 21, and the size of the rear screen window 21 is corresponding to the size of the rear display screen of the folding mobile phone.

Figure 2:
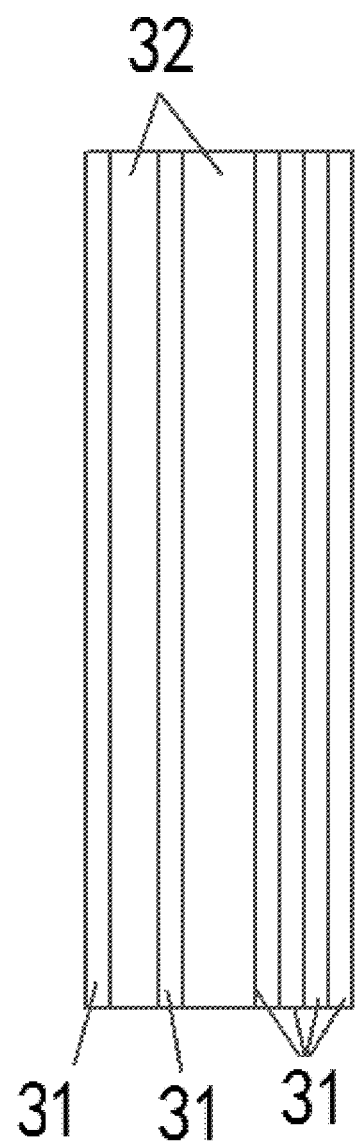
FIG. 2 is a structural schematic diagram of a soft connecting portion provided by an embodiment of the present disclosure.

Optionally, as shown in FIG. 2, the above soft connecting portion specifically comprises n barrier bars 31 and a soft material 32 connecting the adjacent two barrier bars 31. The above n is an integer greater than or equal to three.

The manner in which the soft connecting portion is provided with the n barrier bars 31 and the soft material can improve the service life of the soft connecting portion and increase the flatness. The n barrier bars 31 are not deformed in the contracted or extended state, the deformation is realized by the soft material. If the soft connecting portion is formed of the soft material as a whole, the soft material 32 will stack when contracted, so that it is not easy to make the upper casing and the lower casing form a plane, and the stacked soft material will form a certain thickness to affect the flatness. When n barrier bars 31 are provided, since the n barrier bars 31 have a certain height, the soft material can be stacked between the two barrier bars 31 when contracted, although there will be a stack, the height of the stack will be lower than that of the barrier bars 31, which will not affect the flatness. In addition, the above structure is equivalent to providing n−1 contraction portions, and any contraction failure of these contraction portions will not affect other contraction portions, only the contraction failure of the contraction portion of n−1 contraction portions exceeding 50% will lead to the failure of the soft connecting portion. For the soft connecting portion formed of a single soft material, any contraction failure of a single soft material will result in the entire single soft material being unable to use and having a low service life. Therefore, the above soft connecting portion can greatly increase the service life of the soft connecting portion.

Optionally, the above upper casing 1 further comprises a camera hole 11.

Optionally, the above lower casing 2 further comprises a sensor hole 22. The number of the sensor holes can be flexibly set according to different folding mobile phones, and the number of the sensor holes 22 is not set in the present disclosure.

Optionally, the above soft material may specifically comprise thermoplastic polyurethanes (TPU), thermoplastic elastomer (TPE), silica gel or some other materials with strong flexibility.

In the above embodiments, the description of each of the embodiments has its own emphasis, and the parts that are not detailed in a certain embodiment can refer to the related descriptions of other embodiments.

In the several embodiments provided by the present disclosure, it should be understood that the disclosed device may be implemented in other ways. For example, the device embodiments described above are merely illustrative. For example, the division of the unit is only a logical function division. In actual implementation, there may be another division manner. For example, a plurality of units or components may be combined or may be integrated into another system, or some features may be ignored or not executed. In addition, the mutual coupling, direct coupling or communication connection shown or discussed may be an indirect coupling or communication connection through some interfaces, devices or units, and may be electrical or in other forms.

The embodiments of the present disclosure have been described in detail above. Specific examples are applied herein to set forth the principle and implementation of the present disclosure. The description of the above embodiments is only used to help understand the method and core ideas of the present disclosure; at the same time, those skilled in the art will have a change in the specific implementation and the scope of application according to the idea of the present disclosure. In summary, the content of the present specification should not be construed as limiting the present disclosure.

What is claimed is:

1. A folding mobile phone case comprising an upper casing, a lower casing and a soft connecting portion, wherein one end of the soft connecting portion is connected to the upper casing and the other end of the soft connecting portion is connected to the lower casing, a contact surface of the upper casing and the lower casing is provided with a joint portion, and the upper casing and the lower casing are joined by the joint portion to form a plane; and the upper casing has a size corresponding to that of the upper surface of the folding mobile phone, the lower casing has a size corresponding to that of the lower surface of the folding mobile phone;

a flexible protection portion is disposed at a lower left corner and an upper left corner of the upper casing, and a flexible protection portion is disposed at a lower right corner and an upper right corner of the lower casing, the flexible protection portion has a hollow structure, and a rounded corner thereof is made of a flexible plastic, and a straight line thereof is made of a hard plastic, and the hollow structure is provided with dichloromethane liquid, and the dichloromethane has a volume smaller than that of the hollow structure.

2. The folding mobile phone case of claim 1, wherein the lower casing further comprises a rear screen window, and the rear screen window has a size corresponding to the size of a rear display screen of the folding mobile phone.

3. The folding mobile phone case of claim 1, wherein the soft connecting portion comprises n barrier bars and a soft material connecting two adjacent barrier bars, the n is an integer greater than or equal to three.

4. The folding mobile phone case of claim 1, wherein the upper casing further comprises a camera hole.

5. The folding mobile phone case of claim 1, wherein the lower casing further comprises a sensor hole.

6. The folding mobile phone case of claim 3, wherein the soft material comprises thermoplastic polyurethanes, thermoplastic elastomer or silica gel.

* * * * *